No. 650,424.  
G. H. F. SCHRADER.  
TIRE VALVE ATTACHER.  
(Application filed June 10, 1896.)  
Patented May 29, 1900.

(No Model.)

WITNESSES:  
Fred White  
Thomas F. Wallace

INVENTOR:  
George H. F. Schrader,  
By his Attorneys,

UNITED STATES PATENT OFFICE.

GEORGE H. F. SCHRADER, OF NEW YORK, N. Y.

TIRE-VALVE ATTACHER.

SPECIFICATION forming part of Letters Patent No. 650,424, dated May 29, 1900.

Application filed June 10, 1896. Serial No. 594,917. (No model.)

*To all whom it may concern:*

Be it known that I, GEORGE H. F. SCHRADER, a citizen of the United States, residing in the city, county, and State of New York, have invented certain new and useful Improvements in Tire-Valve Attachers, of which the following is a specification.

This invention relates to tire-valves, and aims to provide improved means for attaching these to the tires of bicycles and the like.

It is found that in using shoe-valves or valves having a flange passing through and clamped within a pneumatic tire there is difficulty in maintaining a tight joint and danger that the tire will be torn at the joint or so weakened as to be unable to resist the air-pressure or the creeping tendency. Heretofore I have endeavored to improve the connection of the valve with the tire by interposing an attaching-strip between the tire and the valve, which strip when cemented to the tire reinforces the latter and assists in preventing leakage. Such a construction is claimed in my application filed November 13, 1895, Serial No. 568,780. My present invention aims to provide means whereby the valve can be clamped both to the tire and to the attacher, whereby all the strength and leak-proof qualities of the latter are availed of, and the strength of the tire where clamped to the valve is also utilized, as distinguished from my former construction, in which the valve was preferably clamped only to the attacher, and then both were applied to the tire by cementing the attacher thereto.

In carrying out my present invention in its preferred form I provide certain features of improvement, which will be hereinafter fully set forth.

Figure 1:
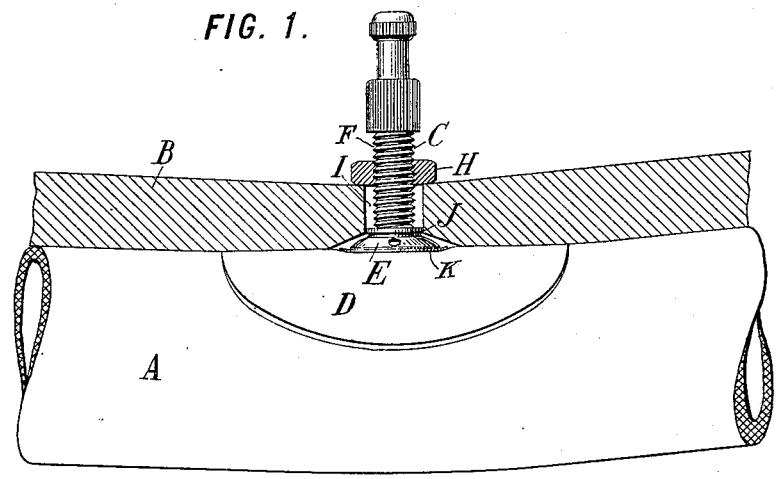
Figure 2:
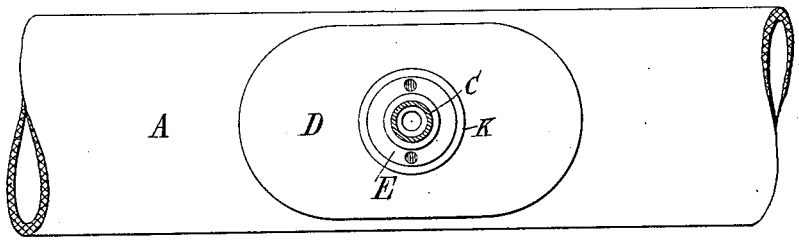
Figure 3:
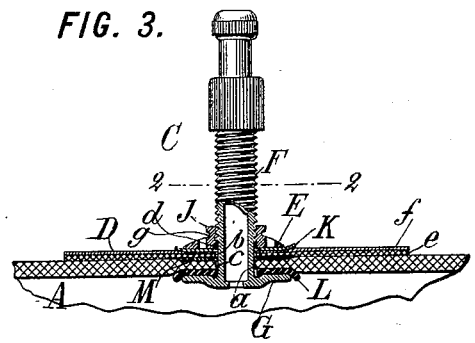
Figure 4:
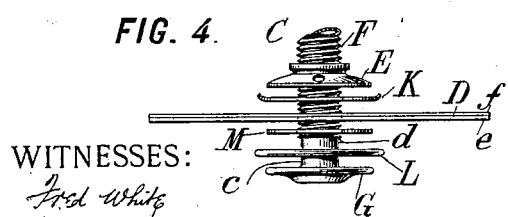
Figure 5:
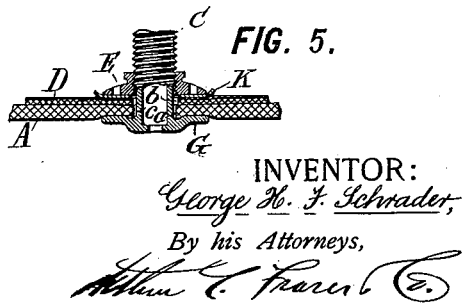

In the accompanying drawings, Figure 1 is a fragmentary side elevation of a tire and valve attached together according to the preferred form of my present invention, the felly of a wheel being shown in section. Fig. 2 is a fragmentary plan view thereof, the valve being in section on the line 2 2 in Fig. 3. Fig. 3 is a fragmentary section of the tire and valve, cut on the axis of the latter, showing the parts in the attached position. Fig. 4 is a fragmentary side elevation of the valve, showing the attacher and other parts separated and the whole in position for application to any tire; and Fig. 5 is a fragmentary section analogous to Fig. 3, but showing a modification.

Referring to the drawings, I will now describe in detail my present improvements.

Let A represent a pneumatic tire; B, the felly of a wheel; C, a tire-valve; D, an attacher therefor; E, a clamping-nut screwing on the external screw-thread F of the valve; G, a shoe or flange at the inner end of the valve; H, a nut holding the valve on the felly; I, a valve-socket in the felly; J, a shoulder on the clamping-nut fitting this socket, and K an antifriction metal disk or washer between the nut E and attacher D. As far as described the parts may be of any usual or suitable construction.

According to one feature of improvement I pass the flange or shoe G of the valve through the hole $a$ of the tire so that it shall embrace the inner face of the latter, and I provide the attacher D at the outer face of the tire, passing it over the valve by inserting the body of the valve through the hole $b$ in the attacher, so that the latter can be cemented to the outer face of the tire, and then the tire and attacher can be clamped together to the valve by screwing home the nut E on the latter until these parts are compressed to the desired degree to effect a tight joint and a suitable engagement. If desired, the rubber washer L or other suitable washer may be employed between the flange G and the inner face of the tire, as the washer K can be interposed between the attaching-flap D and the clamping-face of the nut. The reduced neck $c$ of the valve is made long enough to give room for these parts about the flange G and terminates in the shoulder $d$, which is the lower end of the screw-thread F, which thread is preferably of slightly-greater diameter than the hole $b$ through the attacher, so that the shoulder tends to retain the attacher and parts below it in place when these parts are assembled as an attachment ready for application to any tire. In Fig. 4 the attacher is shown for clearness as moved up over the threads, or in one of the positions it would occupy while being applied to the valve.

The attacher preferably consists of an oblong, circular, or other suitably-shaped sheet of rubber and textile material, the sheet shown having a bottom rubber face e and a top of cloth or other textile material f, these parts being firmly united in the formation of the sheet in any suitable manner. When applied to the tire, the rubber face of the attacher is firmly and tightly cemented to the tire, making a leak-tight joint around the valve, while its cloth back serves, by adhesion to the rubber face, to resist tearing or bursting strains.

The clamping-nut E compresses both the attacher and the wall of the tire to some extent and makes a leak-tight joint around the valve, between the inner face of the tire and the adjacent face of the flange G. When used, the rubber washer L assists in securing a leak-tight joint and cushions the action of the flange against the tire. When the nut E is screwed home, its active face passes somewhat inwardly of the shoulder d. In its position in the socket of the felly its outer shoulder J extends within and snugly fits the cylindrical walls of the socket I. This shoulder is cylindrical and of much smaller diameter than the nut-body and is connected thereto by a contracted neck g, below which the nut is a thin wide member having a convex top face and a smooth bottom face fitting the disk K. This disk is a thin sheet-metal ring passing over the valve C and having a rounded or upwardly-bent edge to avoid injuring the attacher.

If desired, the attacher and tire may be clamped directly together between the flange and nut of the valve, as shown in Fig. 5; but I prefer to interpose between the adjacent faces of the tire and attacher a thin annular washer M. (Shown in Figs. 3 and 4.) This is preferably a thin flat sheet-metal ring large enough to slip over the shoulder d and of nearly the same diameter as the nut E. This is a loose ring separating the surfaces of the tire and attacher where these parts are clamped between the nut and flange. In practice I find it advantageous to employ this ring.

In use the valve, with the attacher, washer or washers, and nut E loosely assembled, as shown in Fig. 4, will be supplied as an attachment ready for application to any tire, or they may be assembled at the time of application to the tire. The use of the rings, disks, and washers will be varied as circumstances dictate.

It will be seen that my invention provides improvements which can be readily and advantageously availed of, and it will be understood that the invention is not limited to the particular details of construction and arrangement set forth as constituting its preferred form.

What I claim is—

1. The tire A, and valve C extending through the tire and having a flange therein, in combination with a felly B having a valve-socket I, and a clamping-nut E screwing on said valve and having a shoulder J snugly fitting said socket, and a reinforce-attacher D adhering to said tire and clamped by said nut to said valve, between said nut and the outer face of said tire, whereby creeping of the tire is prevented by said shoulder, and the creeping strains are transmitted to the valve by both the tire and attacher.

2. As a new article of manufacture, a valve having a wide flange G, a small screw-threaded body for fitting a socket in a wheel-felly, and a reduced cylindrical portion c between said flange and body, in combination with an attacher D clamped to said valve having an aperture surrounding said neck, and having an annular face, opposed to and of greater size than said flange, adapted to be cemented to a pneumatic tire, and a nut E screwing on said body toward said attacher, said flange adapted to be inserted in a hole in such tire, and said neck of a length equaling the thickness of the wall of such tire and of such attacher, and said nut adapted to clamp such wall and attacher between itself and said flange, said valve adapted to resist creeping of the tire, and said reinforce adapted to transmit such creeping strains to said smooth neck.

3. The combination with a wheel-felly having a valve-socket, of a tire having a hole opposite said socket, a reinforce-attacher cemented to said tire around said hole and having a hole coinciding with that in the tire, a valve having a body fitting such socket, an external screw-thread, and a flange at its lower end, passing through the holes in both the tire and attacher, engaging the inner wall of the tire with said flange, and preventing creeping of the tire on the felly, and a nut screwing on the valve against the outer face of the attacher and clamping the latter and the tire to the valve between the nut and said flange, whereby creeping strains are transmitted through both the tire and attacher.

4. The combination with a wheel-felly having a valve-socket, of a tire having a hole opposite said socket, a reinforce-attacher cemented to said tire around said hole and having a hole coinciding with that in the tire, a valve having a body fitting such socket, an external screw-thread, and a flange at its lower end, passing through the holes in both the tire and attacher, having a smooth exterior opposite both, engaging the inner wall of the tire with said flange, and preventing creeping of the tire on the felly, and a nut screwing on the valve against the outer face of the attacher, and clamping the latter and the tire to the valve between the nut and said flange, whereby creeping strains are transmitted through both the tire and attacher, and are received by the smooth exterior of said valve.

In witness whereof I have hereunto signed my name in the presence of two subscribing witnesses.

GEORGE H. F. SCHRADER.

Witnesses:
GEORGE H. FRASER,
THOMAS F. WALLACE.